United States Patent [19]
Zulu

[11] Patent Number: 5,415,596
[45] Date of Patent: May 16, 1995

[54] HYDRO-MECHANICAL STEERING DIFFERENTIAL APPARATUS

[75] Inventor: Joshua Zulu, Chillicothe, Ill.

[73] Assignee: Caterpillar Inc., Peoria, Ill.

[21] Appl. No.: 179,212

[22] Filed: Jan. 10, 1994

[51] Int. Cl.$^6$ .............................................. F16H 48/08
[52] U.S. Cl. ........................................ 475/27; 475/18
[58] Field of Search ................................. 475/18, 27

[56] References Cited

U.S. PATENT DOCUMENTS

| | | | |
|---|---|---|---|
| 2,336,911 | 12/1943 | Zimmermann | 180/9.2 |
| 3,439,559 | 4/1969 | Binger et al. | 74/720.5 |
| 4,423,644 | 1/1984 | Coutant | 74/710 |
| 4,434,680 | 3/1984 | Riediger et al. | 74/682 |
| 4,557,157 | 12/1985 | Oestmann | 74/607 |
| 4,747,339 | 5/1988 | Wüsthof et al. | 92/148 |
| 5,004,060 | 4/1991 | Barbagli et al. | 180/6.44 |

Primary Examiner—Dirk Wright
Attorney, Agent, or Firm—Gordon Pence

[57] ABSTRACT

A hydro-mechanical steering differential for providing differential steering of the left and right hand tracks of a tractor is disclosed. The steering differential is powered by a mechanical input and a hydraulic input, and includes left and right outputs. The improved hydro-mechanical steering differential comprises a geared differential unit having a right output gear element, a left output gear element and a gear carrier element. The gear carrier element is coupled to the mechanical input and has a gear set meshed with right and left output gear elements. The left output gear element is coupled to the left output, and the right output gear element is coupled to the right output. A gearless hydro-mechanical differential unit has a rotatable motor powered by the hydraulic output. The hydro-mechanical has a drive unit coupled to the mechanical input and a driven unit coupled to the right output.

12 Claims, 4 Drawing Sheets

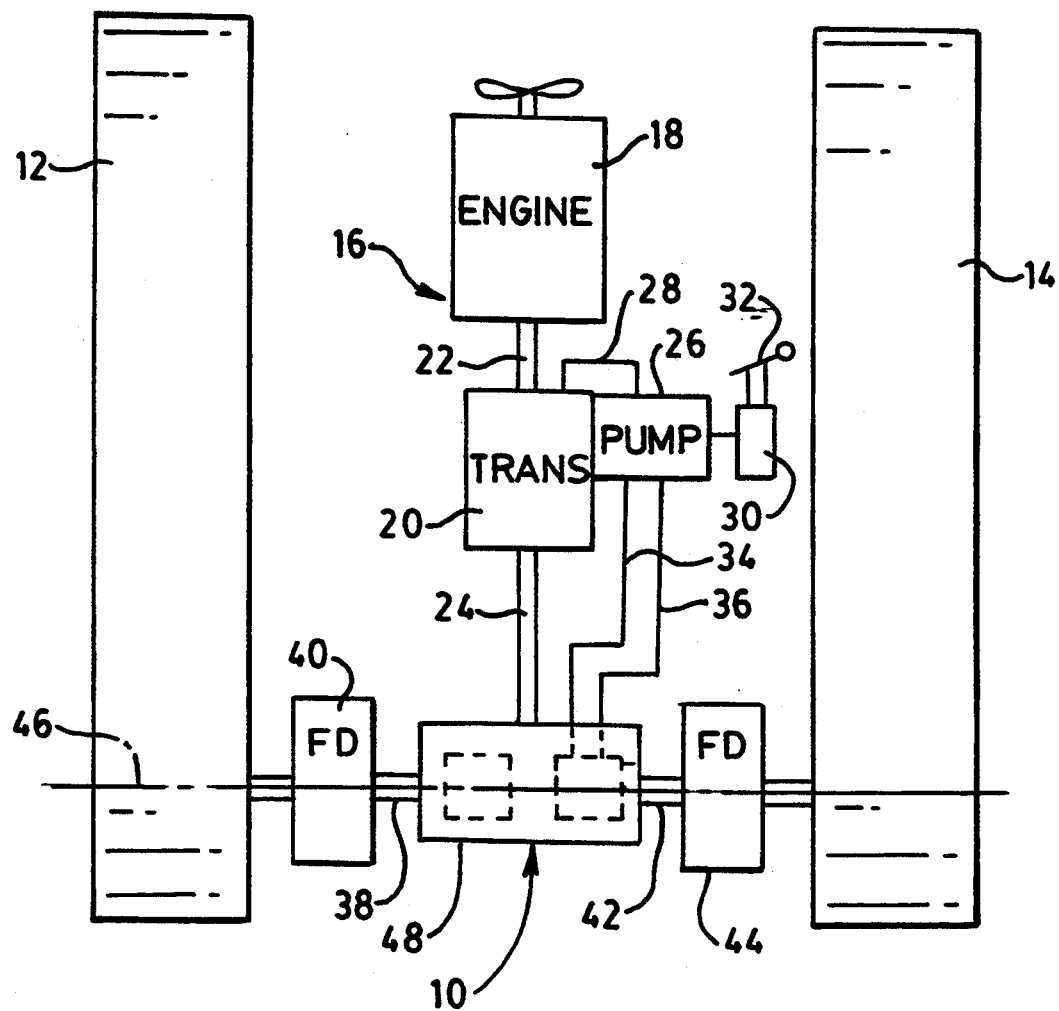
Fig_1_

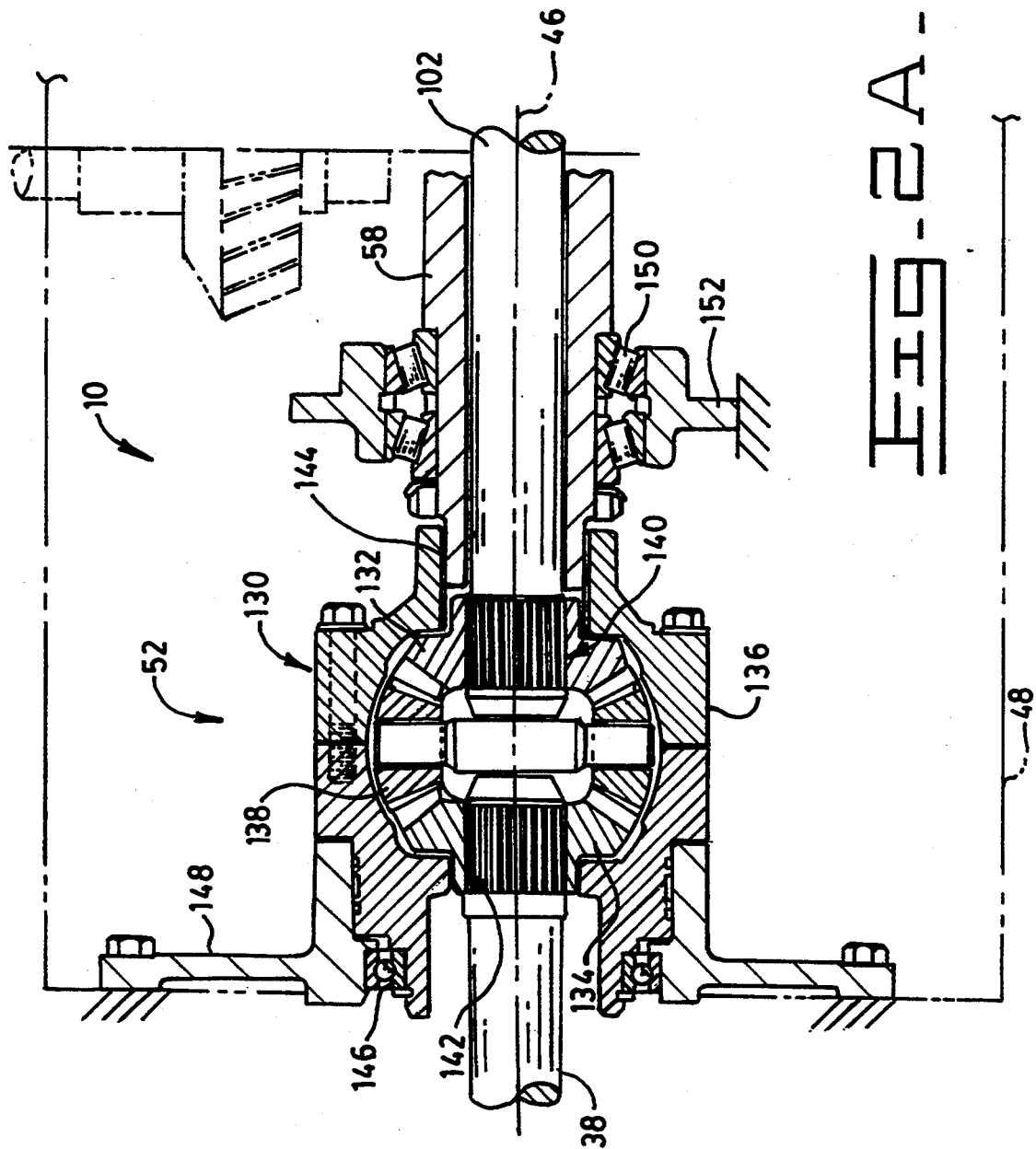

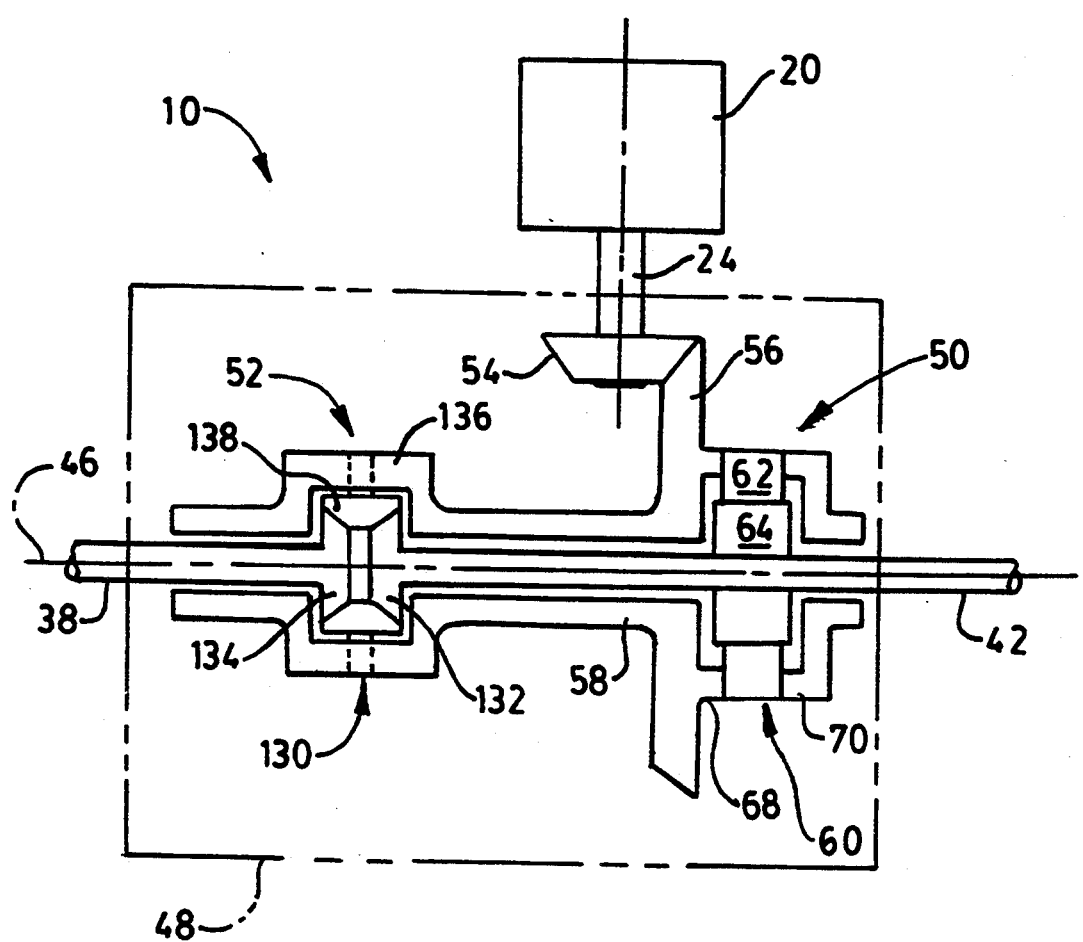

HYDRO-MECHANICAL STEERING DIFFERENTIAL APPARATUS

TECHNICAL FIELD

This invention relates generally to a hydro-mechanical steering differential to provide differential steering of the left and right hand tracks of a tractor and the like and, more particularly, to an improved hydro-mechanical steering differential with a gearless hydro-mechanical differential unit that is more compact and less complex so as to be adaptable to small tractors and the like.

BACKGROUND ART

Hydro-mechanical steering differential systems are popularly employed in large track-type tractors and the like to provide smooth, equal and uninterrupted power and torque flow to both tracks at all times, including turns. A hydro-mechanical steering differential system is powered by a mechanical input and a hydraulic input. The mechanical input is typically from the transmission, while the hydraulic input is received from an engine driven variable displacement pump. One such hydro-mechanical steering differential is disclosed in U.S. Pat. No. 4,434,680 for a Planetary Steering Differential, issued Mar. 6, 1984 to Craig W. Riediger, et al and assigned to the assignee hereof. Such patent discloses the use of three separate planetary mechanisms. While suitable for large tractors, the three planetary mechanisms make the system not only complex and costly, it requires a large amount of space to contain all of the components.

Thus what is desired is a truly compact hydro-mechanical steering differential which is less complex, less costly and adaptable to smaller tractors.

The present invention is directed to overcoming the shortcomings of the prior attempts at providing a such a hydro-mechanical steering differential for smaller tractors.

DISCLOSURE OF THE INVENTION

In accordance with one aspect of the present invention, there is provided a hydro-mechanical steering differential for providing differential steering of the left and right hand tracks of a tractor, wherein the steering differential includes a mechanical input, a hydraulic input and left and right outputs. The improved hydro-mechanical steering differential comprises a geared differential unit having a right output gear element, a left output gear element and a gear carrier element. The gear carrier element is coupled to the mechanical input and has a gear set meshed with the right and left output gear elements. The left output gear element is coupled to the left output, and the right output gear element is coupled to the right output. A gearless hydro-mechanical differential unit has a rotatable motor powered by the hydraulic output. The motor has a drive unit coupled to the mechanical input and a driven unit coupled to the right output.

BRIEF DESCRIPTION OF THE DRAWINGS

FIG. 1 is a diagrammatic plan view of a tractor drive train incorporating a preferred embodiment of a hydro-mechanical steering differential of the of the present invention;

FIGS. 2A is an enlarged cross-sectional view of the left hand portion of the steering differential of FIG. 1 and shows a bevel gear differential portion of the steering differential;

FIG. 3 is an enlarged schematic plan view of the hydro-mechanical steering differential shown in FIG. 1.

BEST MODE FOR CARRYING OUT THE INVENTION

Figure 2B:
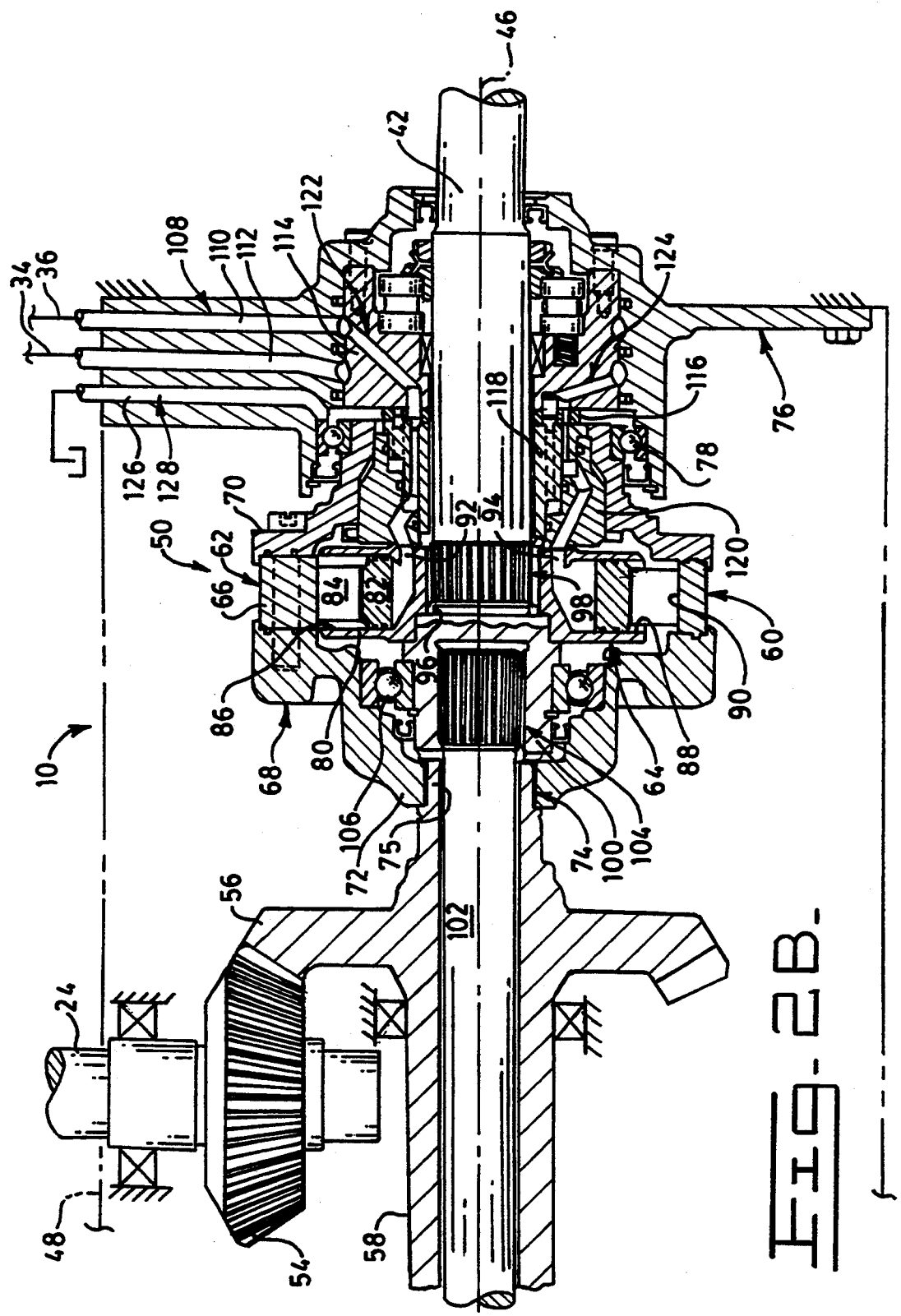
FIG. 2B is an enlarged cross-sectional view similar to FIG. 2A, but of the right hand portion of the steering differential and shows a hydro-mechanical differential portion of the steering differential.

Referring more particularly to the drawings, a hydro-mechanical steering differential embodying the principles of the present invention is generally indicated at 10 in FIG. 1 for providing differential steering of the left and right hand tracks 12, 14, respectively, of a tractor drive train 16 for a track-type tractor or the like (not shown). As is customary, the tractor drive train 16 includes an engine 18 and a transmission 20 connected to the engine by a drive shaft 22. The transmission is connected to the steering differential 10 by a transmission shaft 24 to provide a mechanical input to the steering differential. A hydraulic input to the steering differential is provided by a pump 26, preferably of a reversible, variable displacement type. Pump 26 may be operatively driven from the transmission by means of a suitable drive connection 28. The pump 26 is connected to a control valve 30, which is selectively actuated through a manual control 32. As will be further described below, the pump 26 is connected by hydraulic lines 34 and 36 to the steering differential 10.

The components of the steering differential 10 are preferably contained within and supported by a suitable case 48. A left output is provided by an axle shaft 38 extending from the left hand side of the case 48 and couples the steering differential 10 to the left track 12 through a left final drive 40. A right output is provided by an axle shaft 42 extending from the right hand side of the case 48 and couples the steering differential to the right track 14 through a right final drive 44. The axle shafts 38, 42 are disposed along a common transverse axle axis 46.

Details of the hydro-mechanical steering differential 10 are more clearly depicted in FIGS. 2A and 2B, wherein FIG. 2A shows, in essence, the left hand portion of the steering differential and FIG. 2B shows the right hand portion thereof. The steering differential 10 includes a gearless hydro-mechanical differential unit 50, which is generally shown in FIG. 2B, and a geared mechanical differential unit 52, which is generally shown in FIG. 2A. As best shown in FIG. 2B, the mechanical input from the transmission shaft 24 is connected to a bevel pinion 54 of the steering differential 10. Bevel pinion 54 meshes with a bevel gear 56. Bevel gear 56 is carried on a hollow shaft 58 disposed along the axle axis 46. As will be hereinafter more fully described, the hollow shaft 58 provides the mechanical input to both the hydro-mechanical differential unit 50 and the mechanical differential unit 52.

Referring in particular to FIG. 2B, the gearless hydro-mechanical differential unit 50 includes a rotatable hydraulic motor 60. Such motor 60 is preferably of a low speed, high torque radial piston type as shown. It should be understood, however, that the present invention is not intended to be limited to a particular motor type, as those skills in the art will readily be able to adapt other types of motors, such an axial piston type motor, as a rotatable motor for a gearless differential based upon and without departing from the teachings hereof. It should also be understood that the motor 60 itself may be of any well-known construction. Also, the general principles of operation of such motors are well understood by those skilled in the art. The uniqueness of the present invention is to have the entire motor 60 rotatable, as will hereinafter more fully described, which advantageously eliminates the requirement for separate gearing to perform the differential function.

As shown in FIG. 2B, the motor 60 comprises a drive unit 62 and a driven unit 64. The drive unit 62 includes a cam plate 66. In order to rotatably mount the motor 60, the cam plate 66 is mounted between a carrier 68 on the left and an annular support housing 70 on the right, as shown in FIG. 2B. The carrier 68 is coupled to the hollow shaft 58 by means of a spline connection 74 provided on a hub portion 72 of the carrier 68 and on an adjacent end 75 of the hollow shaft 58. The support housing 70 is rotatably supported to a stationary housing 76 by means of a suitable bearing 78. As should be readily apparent, this arrangement permits the entire motor 60 to rotate about the axle axis 46. The stationary housing 76 may be integral with the case 48 or bolted to the case as shown.

The driven unit 64 comprises a cylinder block 80, pistons 82 and cylindrical rollers 84. The cylinder block 80 has a plurality of radially disposed cylinders therein, one depicted by reference number 86 and another depicted by reference number 88. One of the pistons 82 is reciprocatably disposed in each cylinder 86,88. The cam plate 66 is disposed about the cylinder block 80 and is provided with a suitable inner cam surface 90. Each piston 82 is provided with one of the cylindrical rollers 84 for rolling contact with the cam surface 90 of the cam plate 66. The cylinder block 80 is also provided with a plurality of fluid ports, one of such ports being shown at 92 for cylinder 86 and another being shown at 94 for cylinder 88 in FIG. 2B.

The cylinder block 80 has a central opening 96 for receiving the axle shaft 42 therethrough and is coupled to the shaft by a spline connection at 98. The shaft 42 is preferably provided with an enlarged hollow end 100 for receiving the adjacent end of an intermediate shaft 102. The intermediate shaft 102 and axle shaft 42 are coupled together by a spline connection at 104. It will be appreciated by those skilled in the art that axle shaft 42 and intermediate shaft 102 could be constructed as a single component, but are preferably made as separate components as shown here for manufacturability and assembly purposes. Together, they form the right output as such term is used herein. The carrier 68 is rotatably supported by a suitable bearing 106 mounted about the end 100 of the axle shaft 42.

For the motor 60 to function as intended, pressurized hydraulic fluid from the pump 26 must be conducted to the motor 60 as it rotates. To is accomplish this, means 108 are provided for conducting pressurized hydraulic fluid from the pump 26 to the hydraulic motor 60 to effect the driving of the driven unit 64 of the hydraulic motor 60 by the drive unit 62. Such means 108 for conducting fluid includes first and second inlet/outlet ports 110 and 112 provided in the stationary housing 76 to which hydraulic lines 34 and 36, respectively are connected. Means 108 also preferably includes a pressure manifold 114 and an annular port plate 116 that are connected in a fixed relation to the stationary housing 76, an annular pressure force manifold 118 and a distributor valve 120 that are connected in a fixed relation to the support housing 70, and first and second passage means 122, 124.

The first and second passage means 122, 124 are each separately disposed through the housing 76, pressure manifold 114, port plate 116, pressure force manifold 118 and distributor valve 120 to separately conduct fluid from the first and second inlet/outlet ports 110,112, respectively, to ports 92,94 of the hydraulic motor 60. A third or drain port 126 communicates through a third passage 128 with the interior of the housing 76 for draining off any fluid leakage from within the housing. Further details of the conducting means 108 are not believed necessary to a full understanding of the present invention, as those skilled in hydraulic motor art understand the operation and the plumbing necessary for such motors, and will, therefore, be omitted herefrom.

Referring now to FIG. 2A, the geared differential unit 52 is preferably a bevel gear differential 130, which includes a right hand bevel gear element 132, a left hand bevel gear element 134, and a gear carrier element 136. The carrier element 136 rotatably carries a set of spider gears 138. Each bevel gear element 132, 134 meshes with the set of spider gears 138. The right hand bevel gear element 132 is coupled to the intermediate axle shaft 102 by a spline connection 140 and, thus, to the right axle shaft 42 through spline connection 104. The left hand bevel gear element 134 is coupled to the left axle shaft 38 by a spline connection 142. The carrier element 136 is coupled to the bevel input gear 56 through the hollow shaft 58 by a spline connection 144.

The carrier element 136 may be rotatably supported by a bearing 146 carried within a support member 148 that, in turn, is mounted to the case 48. Similarly, a bearing 150 and support member 152 may be used to rotatably support the hollow shaft 58.

INDUSTRIAL APPLICABILITY

The hydro-mechanic steering differential 10 constructed in accordance with the teachings of the present invention advantageously provides a steering differential with fewer components and gearing through the unique incorporation of a rotatable motor in the hydromechanical portion of the steering differential. The operation of the steering differential may be more readily understood by reference to the schematic representation of such steering differential depicted in FIG. 3. When straight ahead travel of the tractor is desired, only the mechanical input from the transmission 20 is employed. In this regard, the mechanical input is transmitted from the transmission 20 through the transmission shaft 24 to the bevel pinion 54. The bevel pinion 54 drives the bevel gear 56. The bevel gear 56 is coupled to rotate both the carrier element 136 of the mechanical differential unit 52 and the drive unit 62 of the rotatable motor 60 at the same speed and in the same direction.

During such straight ahead travel, fluid to the motor 60 is blocked, which, in effect, prevents any relative rotational movement between the drive unit 62 and the driven unit 64 of the motor. Thus, the drive and driven units rotate together as one unit and turn the left output shaft 42 in the same direction and at the speed that the bevel gear 56 is turning. The right bevel gear 132 of the mechanical differential unit 52 also turns in the same direction and at the same speed by virtue of its connection to the right output shaft 42. With the right bevel gear 132 and spider gear carrier 136 turning in the same direction and at the same speed, the spider gears 138 cause the left bevel gear 134 and the left output axle 38 to turn in the same direction and at the same speed as well. Thus, both tracks 12, 14 will be going in the same direction and at the same speed to effect straight ahead travel. Of course, the direction of the tracks would be reversed if the rotation of the transmission shaft 24 were in the opposite direction, as when the transmission 20 is in reverse gear.

A pivot turn is possible at zero velocity of the tractor. Under these conditions, there will be no mechanical output from the transmission 20 and the gear carrier 136, the bevel gear 56 and the drive unit 62 of the motor 60 will remain stationary. A hydraulic input to the motor 60 will cause the driven unit 64 to rotate in one direction when fluid pressure from the pump 26 is directed to the first inlet/outlet port 110 (see FIG. 2A) and in the opposite direction when such fluid pressure is directed to the second inlet/outlet port 112. When the driven unit 64 rotates in the first direction, it drives the right output axle 42 and the right bevel gear 132 of the mechanical differential unit 52 in the same direction. However, the spider gears 138, which are driven by the right bevel gear 132, will drive the left bevel gear 134 and the left output axle 38 at the same speed, but in the opposite direction. Thus, the tracks 12, 14 will be traveling in opposite directions as well, effecting a pivot turn of the tractor.

With this understanding of the operation of the steering differential 10, it should be readily apparent that turning will be similarly accomplished when the tractor is moving in forward or reverse directions as well. For instance, if a right turn is desired while the tractor is traveling in a forward direction, the steering differential 10 must cause the left track 12 to turn faster than the right track 14. To accomplish this, the motor 60 is operated to cause the driven unit 64 to turn in the opposite direction that the drive unit 62 is being rotated in by the bevel gear 56. This causes the right output axle 42 to turn at a slower speed than the gear carrier 136 of the mechanical differential unit 52. This in turn, will cause left output shaft 38 to turn at a speed greater than the carrier 136 through the differential action of the bevel gears 132 and 134 and the spider gears 138.

If a left hand turn is desired, the opposite conditions will exist. In other words, the motor 60 must be operated to drive the driven unit 64 in the same direction that the drive unit 62 is being rotated in by the bevel gear 56, thereby causing the driven unit 64 to turn at a speed greater than the drive unit 62. When this occurs, the right output shaft 42 will turn at a speed greater than the left output shaft 38, thus effecting a left hand turn.

Thus, the hydro-mechanical steering differential of the present invention is effective in providing smooth, equal and uninterrupted power and torque flow to both tracks at all times, including turns. Furthermore, such turning is infinitely variable throughout the speed of the motor 60.

Other aspects, objects and advantages of the present invention can be obtained for a study of the drawings, the disclosure and the appended claims.

I claim:

1. In a hydro-mechanical steering differential for providing differential steering of the left and right hand tracks of a tractor and wherein said steering differential is powered by a mechanical input, and a hydraulic input and has left and right outputs to the left and right hand tracks, the improvement comprising:

a geared differential unit having a right output gear element, a left output gear element and a gear carrier element, said gear carrier element being coupled to said mechanical input and having a gear set meshed with right and left output gear elements, said left output gear element being coupled to said left output and said right output gear element being coupled to said right output; and a gearless hydro-mechanical differential unit having a rotatable motor powered by said hydraulic input, said hydro-mechanical differential unit having a drive unit coupled to said mechanical input and a driven unit coupled to said right output.

2. The hydro-mechanical steering differential of claim 1, wherein said motor of said hydro-mechanical differential unit is a low speed, high torque radial piston type having a cam plate serving as said drive unit and a piston unit serving as said driven unit.

3. The hydro-mechanical steering differential of claim 2, wherein said geared differential unit is a bevel gear differential type and said gear set is a set of spider gears carried by said carrier element.

4. The hydro-mechanical steering differential of claim 2, wherein said hydro-mechanical differential unit includes a stationary housing, a carrier for coupling said drive unit of said motor to said mechanical input and a support housing for rotatably mounting said drive unit to said stationary housing.

5. The hydro-mechanical steering differential of claim 4, wherein said hydro-mechanical differential unit includes means for conducting pressurized hydraulic fluid from said hydraulic input to said motor.

6. The hydro-mechanical steering differential of claim 5, wherein said motor includes a plurality of fluid ports and said means for conducting hydraulic fluid includes first and second inlet/outlet ports and first and second passage means for conducting fluid from said first and second inlet/outlet ports to selective ones of said ports of said motor during operation of said motor.

7. The hydro-mechanical steering differential of claim 6, wherein said means for conducting hydraulic fluid further includes a pressure manifold and an annular port plate connected in a fixed relation to said stationary housing, and an annular pressure force manifold and a distributor valve connected in a fixed relation to said support housing.

8. In a tractor drive train having a hydro-mechanical steering differential for providing differential steering of the right and left hand tracks of a track-type tractor, said hydro-mechanical steering differential being powered by a mechanical input provided from an engine powered transmission and a hydraulic input provided from a variable displacement pump, the improvement wherein said steering differential comprises:

a bevel gear differential unit having a right output bevel gear, a left output bevel gear and a spider gear carrier, said gear carrier being coupled to said mechanical input and having a spider gear set meshed with said right and left output bevel gears, said left output bevel gear being coupled to said left output and said right output bevel gear being coupled to said right output; and a gearless hydro-mechanical differential unit having a rotatable low speed, high torque radial piston motor powered by said hydraulic input, said motor having a drive cam plate coupled to said mechanical input and a driven piston unit coupled to said right output.

9. The hydro-mechanical steering differential of claim 8, wherein said hydro-mechanical differential unit includes a stationary housing, a carrier for coupling said drive cam plate of said motor to said mechanical input and a support housing for rotatably mounting said drive cam plate to said stationary housing.

10. The hydro-mechanical steering differential of claim 9, wherein said hydro-mechanical differential unit includes means for conducting pressurized hydraulic fluid from said hydraulic input to said driven piston unit of said motor.

11. The hydro-mechanical steering differential of claim 10, wherein said driven piston unit of said motor includes a plurality of fluid ports and said means for conducting hydraulic fluid includes first and second inlet/outlet ports and first and second passage means for conducting fluid from said first and second inlet/outlet ports to selective ones of said ports during operation of said motor.

12. The hydro-mechanical steering differential of claim 11, wherein said means for conducting hydraulic fluid further includes a pressure manifold and an annular port plate connected in a fixed relation to said stationary housing, and an annular pressure force manifold and a distributor valve connected in a fixed relation to said support housing and said first and second passage means individually extend through said stationary housing, said pressure manifold, said port plate, said pressure force manifold and said distributor valve to said fluid ports of said piston unit.

* * * * *